(12) United States Patent
Kwon et al.

(10) Patent No.: US 8,795,877 B2
(45) Date of Patent: *Aug. 5, 2014

(54) ELECTRICAL CONNECTING MEMBER OF ASSEMBLING TYPE AND SECONDARY BATTERY PACK CONTAINING THE SAME

(75) Inventors: Gi-Hwan Kwon, Seoul (KR); Sain Park, Anyang-si (KR); Yongho Cho, Yongin-si (KR)

(73) Assignee: LG Chem, Ltd., Seoul (KR)

(*) Notice: Subject to any disclaimer, the term of this patent is extended or adjusted under 35 U.S.C. 154(b) by 1283 days.

This patent is subject to a terminal disclaimer.

(21) Appl. No.: 12/601,874

(22) PCT Filed: May 30, 2008

(86) PCT No.: PCT/KR2008/003074
§ 371 (c)(1),
(2), (4) Date: May 25, 2010

(87) PCT Pub. No.: WO2008/147153
PCT Pub. Date: Dec. 4, 2008

(65) Prior Publication Data
US 2010/0248007 A1  Sep. 30, 2010

(30) Foreign Application Priority Data
May 31, 2007 (KR) .......................... 10-2007-0053274

(51) Int. Cl.
*H01M 6/42* (2006.01)
(52) U.S. Cl.
USPC .......................................... 429/161; 439/627
(58) Field of Classification Search
CPC ...... H01M 6/42; H01M 6/44; H01M 10/0477
USPC ..................... 429/158–161, 97–100; 439/627
See application file for complete search history.

(56) References Cited

U.S. PATENT DOCUMENTS

| 7,758,995 B2 * | 7/2010 | Kim et al. ........................ 429/82 |
| 7,879,478 B2 * | 2/2011 | Kim et al. ........................ 429/82 |

(Continued)

FOREIGN PATENT DOCUMENTS

| JP | 08287898 A | * 11/1996 | .............. H01M 2/30 |
| JP | 2002-246006 A | 8/2002 | |

(Continued)

OTHER PUBLICATIONS

Machine Translation and Abstract in English of JP 08287898.*

(Continued)

*Primary Examiner* — Barbara Gilliam
*Assistant Examiner* — Claire L Roe
(74) *Attorney, Agent, or Firm* — Birch, Stewart, Kolasch & Birch, LLP

(57) ABSTRACT

A connection member connects a plurality of secondary battery cells when the secondary battery cells are mounted in a battery pack case. The connection member includes terminal connection parts connected to each other for connecting the battery cells. Each terminal connection part includes a first contact part, contacting the electrode terminal of a lower battery cell. An elastic pat tapers upward from the first contact part towards a central axis of each terminal connection part for elastically supporting the lower battery cell. Coupling parts protrude upward from the elastic part such that the protruding coupling pats are coupled to an electrode terminal of an upper battery cell. A second contact part is disposed on the central axis of each terminal connection part such that the second contact part is depressed from the protruding coupling parts, the second contact part contacting the electrode terminal of the upper battery cell.

22 Claims, 7 Drawing Sheets

(56) References Cited

U.S. PATENT DOCUMENTS

2002/0031702 A1* 3/2002 Kimura et al. ............... 429/161
2005/0070164 A1* 3/2005 Mita et al. .................... 439/627
2005/0079408 A1 4/2005 Hirano

FOREIGN PATENT DOCUMENTS

| JP | 2003-162993 A | 6/2003 |
|---|---|---|
| JP | 2003-217556 A | 7/2003 |
| JP | 2006-92828 A | 4/2006 |
| KR | 20-0342451 Y1 | 2/2004 |
| WO | WO-2006/112251 A1 | 10/2006 |

OTHER PUBLICATIONS

Machine Translation and Abstract in English of JP 08-287898 (translated May 2013).*

* cited by examiner

104

ELECTRICAL CONNECTING MEMBER OF ASSEMBLING TYPE AND SECONDARY BATTERY PACK CONTAINING THE SAME

FIELD OF THE INVENTION

The present invention relates to a connection member that is used to electrically connect batteries to one another, and, more particularly, to a connection member including terminal connection parts for connecting battery cells arranged in the longitudinal direction in series to each other, the terminal connection parts being connected to each other for achieving the connection in parallel between the battery cells arranged in the lateral direction, each terminal connection part including a first contact part configured to correspond to the external shape of an electrode terminal of a lower battery cell, the first contact part contacting the electrode terminal of the lower battery cell, an elastic part for elastically supporting the lower battery cell, protruding coupling parts coupled to a predetermined region of an electrode terminal of an upper battery cell, and a second contact part contacting the electrode terminal of the upper battery cell.

BACKGROUND OF THE INVENTION

As mobile devices have been increasingly developed, and the demand of such mobile devices has increased, the demand of secondary batteries has also sharply increased as an energy source for the mobile devices.

Depending upon kinds of external devices in which the secondary batteries are used, the secondary batteries may be used in the form of a single battery or in the form of a battery pack having a plurality of unit cells electrically connected to one another. For example, small-sized devices, such as mobile phones, can be operated for a predetermined period of time with the power and the capacity of one battery. On the other hand, a secondary battery pack needs to be used in middle- or large-sized devices, such as laptop computers, portable digital versatile disc (DVD) players, small-sized personal computers (PCs), electric vehicles, and hybrid electric vehicles, because high power and large capacity are necessary for the middle- or large-sized devices.

The secondary battery pack is manufactured by connecting a protection circuit to a battery core pack having a plurality of unit cells connected in series and/or in parallel to one another. When prismatic batteries or pouch-shaped batteries are used as the unit cells, the prismatic batteries or the pouch-shaped batteries are stacked such that large-sized surfaces of the prismatic batteries or the pouch-shaped batteries face each other, and then electrode terminals of the prismatic batteries or the pouch-shaped batteries are connected to one another by connection members, such as bus bars. Consequently, when a three-dimensional secondary battery pack having a hexahedral structure is to be manufactured, the prismatic batteries or the pouch-shaped batteries are preferably used as unit cells of the secondary battery pack.

On the other hand, cylindrical batteries generally have electric capacities larger than the prismatic batteries or the pouch-shaped batteries. However, it is difficult to arrange the cylindrical batteries in a stacked structure due to the external shape of the cylindrical batteries. When the secondary battery pack is constructed generally in a line-type structure or in a plane-type structure, though, the cylindrical batteries are structurally more advantageous than the prismatic batteries or the pouch-shaped batteries.

Consequently, a secondary battery pack having a plurality of cylindrical batteries connected in parallel and in series to one another is widely used in laptop computers, portable DVD players, and portable PCs. The secondary battery pack may be constructed in various core pack structures. For example, the secondary battery pack may be generally constructed in a 2P(parallel)-3S(series) line-type structure, a 2P-3S plane-type structure, a 2P-4S line-type structure, or a 2P-4S plane-type structure.

The parallel connection structure is accomplished by adjacently arranging two or more cylindrical batteries in the lateral direction thereof, while electrode terminals of the cylindrical batteries are oriented in the same direction, and connecting the electrode terminals of the cylindrical batteries to one another using connection members by welding. The cylindrical batteries connected in parallel to one other may be referred to as a "bank."

The series connection structure is accomplished by arranging two or more cylindrical batteries in the longitudinal direction such that electrode terminals of the cylindrical batteries having opposite polarities are successively disposed one after another, or arranging two or more cylindrical batteries in the lateral direction, while electrode terminals of the cylindrical batteries are oriented in opposite directions, and connecting the electrode terminals of the cylindrical batteries to one another using connection members by welding.

The electrical connection between the cylindrical batteries is generally accomplished by spot welding using thin connection members, such as metal plates (for example, nickel plates).

FIG. 1 illustrates a secondary battery pack constructed in a 2P-3S plane-type structure in which batteries are electrically connected to one another by spot welding. For easy understanding, the coupling between the batteries constituting the secondary battery pack of the 2P-3S plane-type structure is shown in an exploded view.

As shown in FIG. 1, three pairs of batteries 20 and 21, connected in parallel to each other for each pair, are connected in series to one another via metal plates 30 to constitute a core pack 10.

FIG. 2 is a typical view illustrating a secondary battery pack 50 after the assembly of the secondary battery pack 50 is completed. For convenience of description, a pack case is omitted.

As shown in FIG. 2, the respective batteries 20 and 21 are connected to a protection circuit module 90 via a cathode conducting wire 60 and an anode conducting wire 70 connected to the metal plates and flexible printed circuit boards (FPCB) 80 connected to the conducting wires. The electrical connection between the metal plates 30 and the protection circuit module 90 is mostly achieved by soldering.

Generally, the secondary battery pack is repeatedly charged and discharged during the use of the secondary battery pack, and the secondary battery pack uses lithium secondary battery, which exhibits low safety in abnormal conditions, such as external impact, dropping, penetration of a needle-shaped body, overcharge, overcurrent, etc., as a unit cell. In order to solve such a safety-related problem, therefore, a safety element, such as a protection circuit module, is included in the secondary battery pack. The safety element acquires information, such as voltage, at a corresponding terminal connection region of the secondary battery pack to perform a predetermined safety process, thereby securing the safety of the secondary battery pack. Consequently, when the connection state of the corresponding region is variable, for example, the resistance value of the terminal connection region changes due to vibration, the detected information is inaccurate, and therefore, the safety element cannot perform the desired process. For this reason, the electrical connection between the battery cells and the protection circuit is generally achieved by soldering.

Also, it is necessary to connect a plurality of battery cells in series or in parallel to one another to constitute a high-power, large-capacity secondary battery pack. In addition, a stable coupling method that is capable of minimizing the resistance change of the terminal connection region is required to uniformly maintain the efficiency of the secondary battery pack. Generally, the electrical connection between the battery cells is achieved by soldering or welding, preferably spot welding.

The welding or soldering process between the battery cells has the following problems. Specifically, the welding or soldering process requires worker's skilled technique and know-how. In addition, the control of parameters necessary to decide the intensity of welding must be continuously performed. As a result, the production process is complicated, and the production costs increase, whereby the production efficiency lowers. Also, a short circuit may occur at the welded region, due to the vibration generated from the battery pack or external impact applied to the battery pack, at the time of directly welding or soldering the battery cells. In addition, electrical or thermal damage is caused between the battery cells and the connection members, whereby the safety of the batteries is threatened, and the defective product rate increases. Furthermore, when some of the battery cells become defective, during the manufacturing or use of the battery cells, all the battery cells constituting the battery pack must be discarded.

Consequently, there is a high necessity for a technology that is capable of substituting for the connection method based on such welding or soldering, which threatens the safety of the batteries and requires a complicated working process, and, at the same time, reusing the remaining battery cells, although some of the battery cells are defective, while stably securing the connection structure between the battery cells.

Meanwhile, for a battery pack using primary batteries, various attempts have been made to achieve the electrical connection between the respective batteries. For example, Korean Patent No. 0413381 discloses a technology for forming conductive coils at opposite ends of battery cases to electrically connect batteries to one another. U.S. Pat. No. 525,037 discloses a technology for mounting metal plates, which are bent to exhibit elasticity, at opposite ends of batteries to achieve electrical connection between the respective batteries.

However, the above-mentioned technologies have a problem in that it is required for connection members to exhibit elasticity enough to fix the battery cells and stably connect electrode thermals to one another, and therefore, connection members exhibiting low elasticity is limited to use. Especially, the technology using the conduction coils has problems in that the sectional area of a wire constituting each coil is small, and the connection length of the wire is relatively large, whereby the electrical resistance increases. The increase of the electrical resistance causes power loss and increases the amount of heat generated, whereby the stable connection between the batteries may be obstructed. On the other hand, for the technology using the metal plates that are bent to have elasticity, the metal plates may lose their elasticity or break when an excessive force is applied to the metal plates at the time of inserting the battery cells into the pack case, or the metal plates are repeatedly used, with the result that, when external impact is applied to the battery cells, the battery cells may be separated from the pack case or the electrical connection between the battery cells may be cut off.

Furthermore, the above-mentioned connection member is limited to apply to the previously described secondary battery pack due to the variable connection state at the corresponding region.

Consequently, there is a high necessity for a technology that is capable of substituting for the connection method based on such welding or soldering, which threatens the safety of the batteries and requires a complicated working process, and, at the same time, stably securing the connection structure between the battery cells.

SUMMARY OF THE INVENTION

Therefore, the present invention has been made to solve the above problems, and other technical problems that have yet to be resolved.

Specifically, it is an object of the present invention to provide a connection member that is capable of stably achieving the electrical connection between two or more secondary battery cells without performing a soldering or welding process.

It is another object of the present invention to provide a connection member constructed in a specific structure in which an assembly process is easily performed, and the connection member is freely attached and detached as necessary.

It is a further object of the present invention to provide a secondary battery pack manufactured using the connection member.

In accordance with one aspect of the present invention, the above and other objects can be accomplished by the provision of a connection member for electrically connecting a plurality of secondary battery cells arranged in the longitudinal direction and in the lateral direction in a physical contact fashion, when the secondary battery cells are mounted in a battery pack case, wherein the connection member includes terminal connection parts for connecting the battery cells arranged in the longitudinal direction in series to each other, the terminal connection parts being connected to each other for achieving the connection in parallel between the battery cells arranged in the lateral direction, each terminal connection part including (a) a first contact part configured to correspond to the external shape of an electrode terminal of a lower battery cell, the first contact part contacting the electrode terminal of the lower battery cell at a region adjacent to the outer circumference of the electrode terminal, the first contact part having a predetermined width, (b) an elastic part tapered upward from the first contact part toward a central axis of each terminal connection part for elastically supporting the lower battery cell, (c) protruding coupling parts protruding upward from the elastic part to a predetermined height such that the protruding coupling parts are coupled to an electrode terminal of an upper battery cell, and (d) a second contact part disposed on the central axis of each terminal connection part such that the second contact part is depressed to a predetermined depth from the protruding coupling parts, the second contact part contacting the electrode terminal of the upper battery cell, and wherein the connection member is provided at one side thereof with a circuit connection terminal part.

Consequently, the connection member according to the present invention does not need a welding or soldering process for electrical connection between the electrode terminals of the battery cells. The connection between the battery cells is stably maintained only by the coupling of the assembly type connection member to the battery cells. Therefore, it is possible to prevent the occurrence of short circuits of the battery cells, which may be caused during soldering or welding. Also, it is possible to minimize the change in resistance at the connection regions due to external impact. At the same time, it is possible to easily perform a battery pack assembly process and to achieve stable coupling between the electrode terminals of the battery cells. Furthermore, when some of the battery cells are defective during the assembly or the use of the battery pack, the battery cells may be easily separated from each other, with the result that it is possible to solve a problem in that all the battery cells constituting the battery pock will be discarded due to the defectiveness of some battery cells or the connection member.

The connection member may be manufactured in a single body by pressing a conductive sheet. Specifically, the conductive sheet is punched or rolled according to the shape of the connection member, with the result that the first contact part and the second contact part, which will contact the electrode terminals of the battery cells, the elastic part, which will elastically support the lower battery cell, and the protruding coupling parts, which will be coupled to predetermined regions of the electrode terminal of the upper battery cell, are easily and simply manufactured.

The connection member is preferably used for cylindrical battery cells. In this case, the contact parts, the elastic part, and the protruding coupling parts of the connection member are constructed in a concentric circle structure, which corresponds to the shape of the electrode terminal of the cylindrical battery cell, with the result that the contact area therebetween is maximized.

Generally, a cylindrical battery cell is constructed in a structure in which a cathode terminal protrudes from one end of the cylindrical battery cell, and an entire battery case constitutes an anode terminal in a state in which the battery case is isolated from the cathode terminal. The contact parts includes the first contact part and the second contact part contacting the electrode terminals of the battery cell.

In this specification, the concentric circle structure means a structure in which the respective regions are formed to approximately have a shape of a concentric circle outward from the central axis of the connection member.

For example, the second contact part, the protruding coupling parts, the elastic part, and the first contact part may be sequentially arranged outward from the central axis of the connection member in a structure in which the concentric circles corresponding to the inner or outer diameters of the respective parts are increased.

Preferably, the width of the first contact part contacting the battery cell is 5 to 20% of the radius of each terminal connection part. When the contact width of the first contact part is less than 5%, the resistance at the contact region increases due to the small contact area. Also, the electrode terminal of the battery cell becomes out of position due to external impact, with the result that the electrical connection may be easily cut off. On the other hand, when the contact width of the first contact part exceeds 20%, the sizes of the remaining parts, including the elastic part, decrease, with the result that it is difficult to provide a predetermined elastic force, and it is difficult to couple the protruding coupling parts to the corresponding regions of the battery cell.

Preferably, the elastic part has a width equivalent to 20 to 60% of the radius of each terminal connection part and a tilt angle of 5 to 30 degrees. When the width of the elastic part is less than 20% of the radius of each terminal connection part, it is difficult to provide a predetermined elastic force, as previously described. On the other hand, when the width of the elastic part exceeds 60% of the radius of each terminal connection part, the areas of the contact parts contacting the electrode terminals of the battery cells are relatively reduced, with the result that a desired electrical connection is not achieved. Also, when the tilt angle of the elastic part is less than 5 degrees to the lower end of each terminal connection part, i.e., the first contact part, it is difficult to provide a predetermined elastic force against external impact. On the other hand, when the tilt angle of the elastic part exceeds 30 degrees, the inner space of the battery pack is reduced, and the elastic part may break when external pressure is applied to the elastic part.

Preferably, the protruding coupling parts have a height equivalent to 30 to 70% of the total height of the connection member. When the height of the protruding coupling parts is less than 30%, which means that the size of the protruding regions is small, it is difficult to couple the protruding coupling parts to predetermined regions of the electrode terminal of the battery cell. On the other hand, when height of the protruding coupling parts exceeds 70%, it is required to further increase the inner space of the battery pack, whereby the size of the battery pack increases.

The shape of the protruding coupling parts is not particularly restricted so long as the protruding coupling parts are easily coupled to the predetermined regions of the electrode terminal of the battery cell. Preferably, however, the protruding coupling parts are constructed in a structure in which two or more bridges connecting the elastic part and the second contact part are arranged in a symmetrical fashion. In this structure, it is possible to provide a high coupling force by the elastic-structured protruding coupling parts.

In a preferred embodiment, the protruding coupling parts are formed approximately in the vertical sectional shape of "∩" to be easily inserted into the predetermined regions of the electrode terminal of the battery cell. In this case, a process for coupling the protruding coupling parts to the predetermined regions of the electrode terminal of the battery cell is more easily carried out. After the coupling between the protruding coupling parts and the predetermined regions of the electrode terminal of the battery cell, the protruding coupling parts do not easily separate from the predetermined regions of the electrode terminal of the battery cell even due to external vibration. According to circumstances, each protruding coupling part may be provided at one side thereof with a coupling protrusion, which protrudes toward the central axis of each terminal connection part.

The coupling protrusion may be constructed in various structures. For example, the coupling protrusion may be constructed in a structure in which the inner end of each protruding coupling part is bent toward the second contact part, or the coupling protrusion may protrude from the inner side of each protruding coupling part in the shape of a hemispherical protrusion. However, the coupling protrusion is not limited to the above-specified structure.

Since the protruding coupling parts are constructed in a structure in which a plurality of bridges are arranged in a symmetrical fashion, and the protruding coupling parts are formed approximately in the vertical sectional shape of "∩," as previously described, elastic insertion and coupling of the protruding coupling parts are achieved irrespective of the coupling protrusions formed at the sides of the respective protruding coupling parts, at the time of coupling the protruding coupling parts to the predetermined regions of the electrode terminal of the battery cell.

Preferably, the connection member further includes downward protrusions extending from the end of the elastic part between the respective bridges connecting the elastic part and the second contact part. Consequently, the elastic force of the elastic part in increased, and the occurrence of an instantaneous short circuit of the electrode terminal is prevented when an external force, such as vibration or bending, is applied to the battery pack.

In this case, each of the downward protrusions preferably has an end inclined to a height lower than that of the first contact part toward the central axis of each terminal connection part. The downward protrusions extending to the height lower than that of the first contact part elastically support the elastic part in a state in which the connection member is in contact with the electrode terminal of the lower battery cell. Also, the downward protrusions are maintained connected to the electrode terminal of the lower battery cell. Consequently, the occurrence of an instantaneous short circuit of the electrode terminal due to the unstable connection state of the first contact part is prevented when an external force as previously described is applied.

Preferably, the downward protrusions are inclined at an angle of 20 to 70 degrees to the horizontal section of the connection member. When the downward protrusions are inclined at an angle of less than 20 degrees, it is difficult for the downward protrusions to maintain their elasticity when the downward protrusions come into contact with the electrode terminal of the battery cell. On the other hand, when the downward protrusions are inclined at an angle of more than 70 degrees, the downward protrusions may damage, for example scratch, the electrode terminal, or the downward protrusions may break during the assembly or the use of the battery pack.

In a preferred embodiment, the first contact part is provided at the outer circumference thereof with one or more downward extensions constructed in a structure to partially cover the upper-end side of the lower battery cell. Since the downward extensions are constructed in a structure to partially cover the upper-end side of the lower battery cell, it is possible to prevent the connection member from deviating in position from the lower battery cell due to external impact, and therefore, the stable connection is achieved.

Preferably, the one or more downward extensions are arranged along the outer circumference of the first contact part in a symmetrical structure. Consequently, the prevention of the connection member from deviating in position from the lower battery cell and the stable connection is more effectively achieved.

The length of the downward extensions is not particularly restricted so long as the downward extensions are constructed in a structure to provide the above-mentioned effects. For example, the downward extensions may have a length equivalent to 20 to 150% of the total height of the connection member.

This structure enables the connection member to be connected to the upper battery cells and the lower battery cells in a coupling fashion. That is, the protruding coupling parts of the connection member are coupled to the electrode terminals of the upper battery cells, and the downward extensions of the connection member are coupled to the electrode terminals of the lower battery cells. Consequently, the connection member is coupled to both the upper and lower battery cells.

The circuit connection terminal part may be an input and output terminal for power supply, a detection terminal for voltage detection, or a combination thereof. The circuit connection terminal part may be formed in various shapes. For example, circuit connection terminal part may be formed in the shape of a strip. The strip-shaped circuit connection terminal part may be bent such that the circuit connection terminal part is brought into tight contact with the side of the lower battery cell after the connection member is mounted to the lower battery cell.

The connection member may be constructed in a structure including a single terminal connection part to connect battery cells arranged in the longitudinal direction only in series to each other. According to a modification, the connection member includes (a) a first contact part configured to correspond to the external shape of an electrode terminal of a lower battery cell, the first contact part contacting the electrode terminal of the lower battery cell at a region adjacent to the outer circumference of the electrode terminal, the first contact part having a predetermined width, (b) an elastic part tapered upward from the first contact part toward a central axis of the connection member for elastically supporting the lower battery cell, (c) protruding coupling parts protruding upward from the elastic part to a predetermined height such that the protruding coupling parts are coupled to an electrode terminal of an upper battery cell, and (d) a second contact part disposed on the central axis of the connection member such that the second contact part is depressed to a predetermined depth from the protruding coupling parts, the second contact part contacting the electrode terminal of the upper battery cell, the connection member being provided at one side thereof with a circuit connection terminal part.

In accordance with another aspect of the present invention, there is provided a battery pack including a plurality of secondary battery cells electrically connected to one another by the connection member according to the present invention.

Specifically, the battery pack may be constructed in a structure in which a plurality of cylindrical battery cells are electrically connected to one another in rows in a pack case, wherein the battery cells arranged in the longitudinal direction and in the lateral direction are electrically connected to one another by the connection member.

The battery pack may be constructed in various structures. For example, the battery pack may be constructed in a 2P-3S line-type structure, a 2P-3S plane-type structure, a 2P-4S line-type structure, or a 2P-4S plane-type structure.

Preferably, a cathode terminal of a battery cell (a) is electrically connected to the upper part of the connection member via a second contact part, and an anode terminal of a battery cell (b) is electrically connected to the upper part of the connection member via a first contact part. That is, a cathode terminal of a cylindrical battery cell may be electrically connected to the second contact part of the connection member in a physical contact fashion, and an anode terminal of another cylindrical battery cell may be electrically connected to the upper part of the connection member via the first contact part of the connection member in a physical contact fashion. In this case, the protruding coupling parts of the connection member are elastically coupled in gas exhaust ports formed at the cathode terminal of the cylindrical battery cell.

In a preferred embodiment, the protruding coupling parts are constructed in a structure in which two or more bridges connecting an elastic part and the second contact part are arranged in a symmetrical fashion, each protruding coupling part is provided at one side thereof with a coupling protrusion, which protrudes toward the central axis of the connection member, and the protruding coupling parts are coupled to the inside ends of the gas exhaust ports when the connection member is coupled to the gas exhaust ports formed at the cathode terminal of the battery cell. The coupling protrusions coupled to the inside ends of the gas exhaust ports prevent the connection member from deviating in position from the electrode terminal of the battery cell when external impact or vibration is applied to the battery pack.

In the present invention, the material for the connection member is not particularly restricted so long as the connection member exhibits electrical conductivity and elasticity.

Preferably, the connection member is made of a metal sheet in consideration of easiness in processing. For example, the connection member may be made of a material selected from a group consisting of nickel, brass, aluminum, copper, and alloys thereof.

The battery pack according to the present invention may be used as a power source for household electric appliances, such as portable digital versatile disc (DVD) players, small-sized personal computers (PCs), etc., requiring high power and large capacity. Preferably, the battery pack according to the present invention is used as a power source for laptop computers.

In accordance with a further aspect of the present invention, there is provided a laptop computer including the battery pack as a power source. The general structure of the laptop computers and a method of manufacturing the same are well known in the art to which the present invention pertains, and therefore, a further description thereof will not be given.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
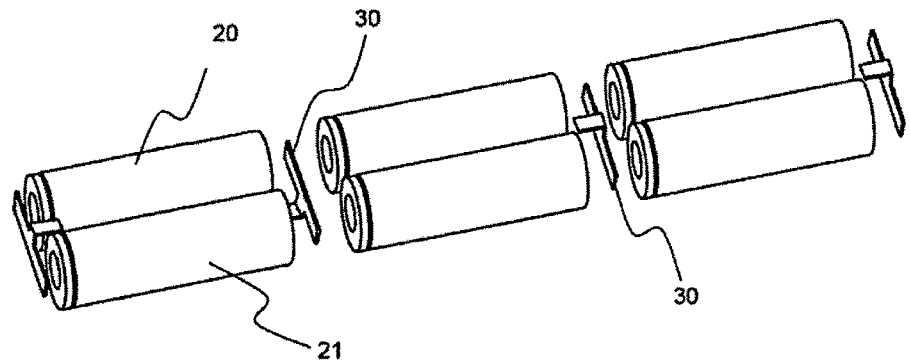
FIG. 1 is an exploded perspective view illustrating the coupling between batteries electrically connected to each other by conventional connection members, such as metal plates.
Figure 2:
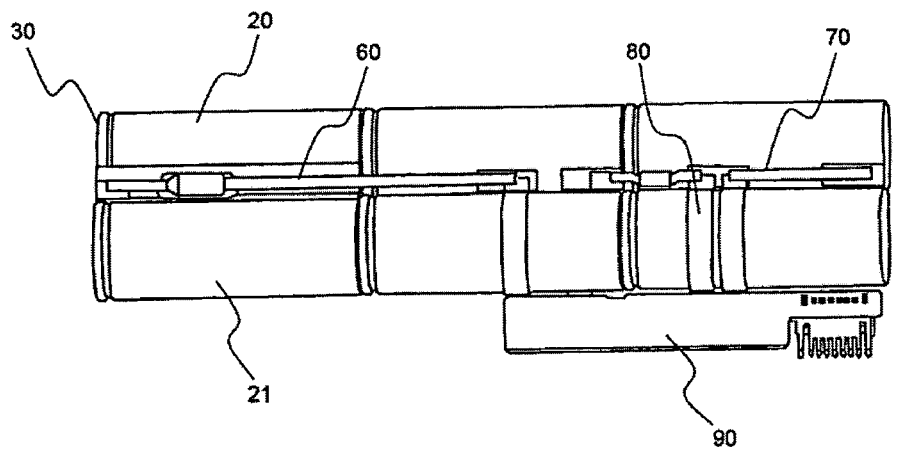
FIG. 2 is a typical view illustrating a battery pack in which metal plates are connected to a protection circuit.
Figure 3:
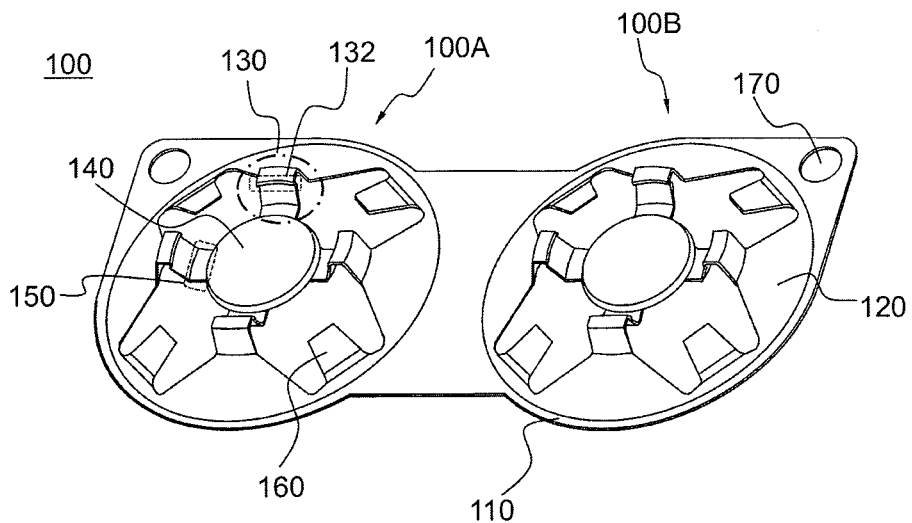
FIG. 3 is a perspective view illustrating a connection member according to a preferred embodiment of the present invention.
Figure 4:
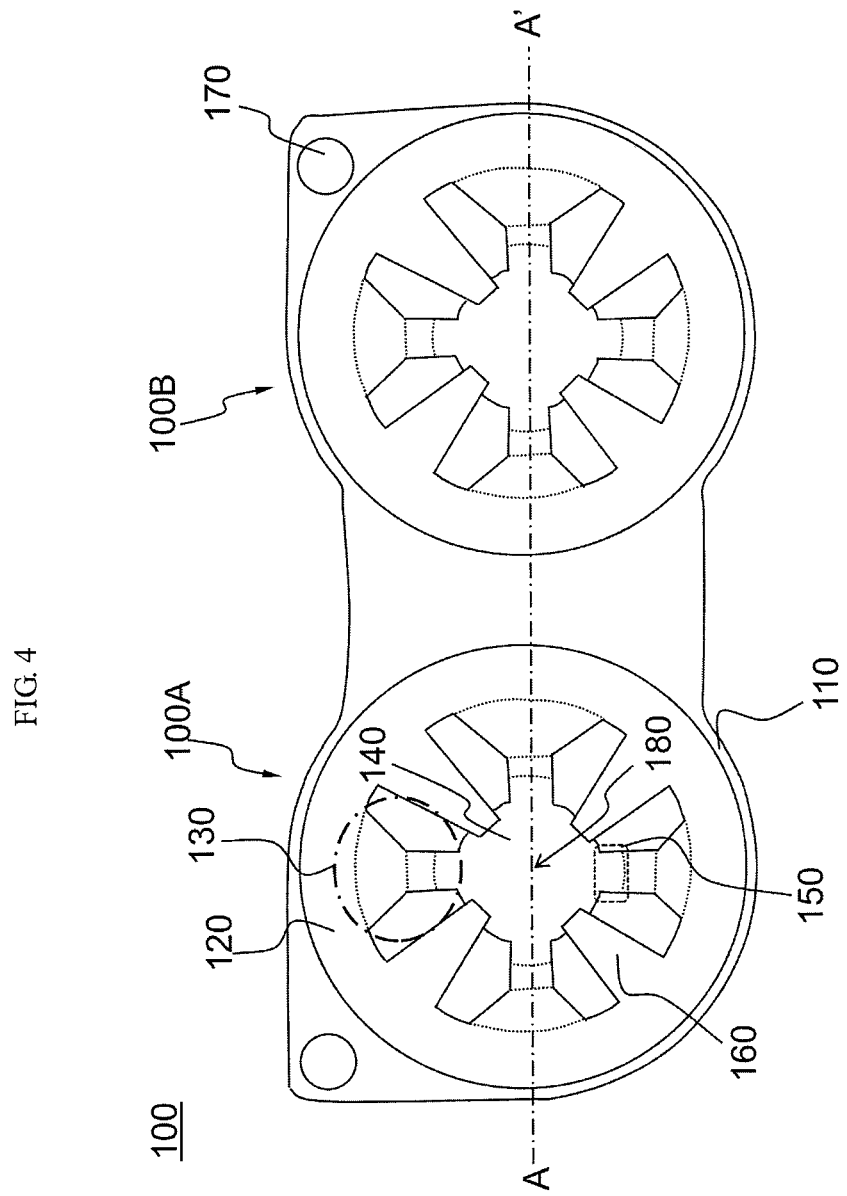
FIG. 4 is a bottom view of FIG. 3.
Figure 5:
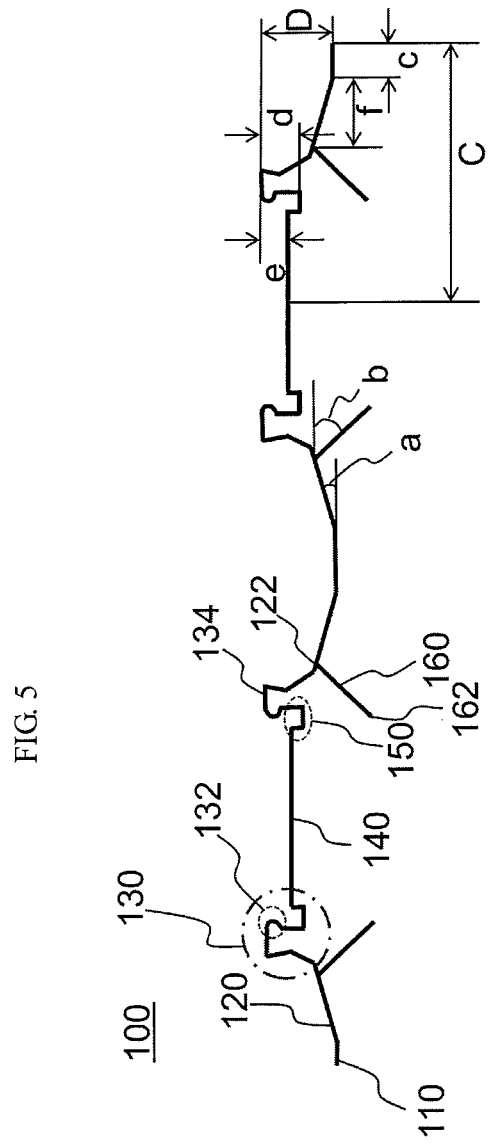
FIG. 5 is a vertical sectional view taken along line A-A' of FIG. 4.

FIG. 3 is a perspective view illustrating a connection member according to a preferred embodiment of the present invention, FIG. 4 is a bottom view of FIG. 3, and FIG. 5 is a vertical sectional view taken along line A-A' of FIG. 4.

Referring to these drawings, the connection member 100 according to the present invention includes two terminal connection parts 100A and 100B connected to each other and circuit connection terminal parts 170 for connection to an external circuit.

Each of the terminal connection parts 100A and 100B includes a first contact part 110 electrically connected to an electrode terminal of a lower battery cell (not shown), the first contact part 110 having a predetermined width c, an elastic part 120 extending from the first contact part 110 toward a central axis 180 of each terminal connection part such that the elastic part 120 is tapered upward, protruding coupling parts 130 protruding upward from the elastic part 120 to a predetermined height d, and a second contact part 140 disposed on the central axis 180 of each terminal connection part such that the second contact part 140 is depressed to a predetermined depth e from upper end surfaces 134 of the protruding coupling parts 130, the second contact part 140 being electrically connected to an electrode terminal of an upper battery cell (not shown).

The width c of the first contact part 110 contacting the electrode terminal of the lower battery cell is approximately 10% of the radius C of each terminal connection part. The first contact part 110 is formed in the shape of a concentric circle corresponding to the outer surface of the electrode terminal of the lower battery cell.

The elastic part 120 has a width f equivalent to approximately 30% of the radius C of each terminal connection part. The elastic part 120 is tapered upward at a tilt angle a of 10 degrees toward the central axis 180 of each terminal connection part from the first contact part 110. Consequently, the elastic connection between the first contact part 110 and the electrode terminal of the lower battery cell is maintained by the elastic part 120.

The height d of the protruding coupling parts 130 is approximately 50% of the total height D of the connection member 100. The protruding coupling parts 130 are formed approximately in the vertical sectional shape of "∩." Also, each protruding coupling part 130 is provided at the inside thereof with a coupling protrusion 132, which protrudes toward the central axis 180 of each terminal connection part. The coupling protrusion 132 is constructed in a structure in which the inner end of each protruding coupling part 130 is bent toward the second contact part 140. Consequently, the structure of the protruding coupling parts 130 prevents the connection member from separating from the upper battery cell after the connection member is coupled to a predetermined region of the electrode terminal of the upper battery cell. At this time, the second contact part 140 contacts the central region of the electrode terminal of the upper battery cell, whereby the electrical connection is achieved.

The protruding coupling parts 130 are constructed in a structure in which four bridges 150 connecting the elastic part 120 and the second contact part 140 are radially arranged in a symmetrical fashion. Specifically, the bridges 150, arranged at predetermined intervals, connect the elastic part 120 and the second contact part 140. The bridges 150 protrude upward to constitute the respective protruding coupling parts 130.

Also, four downward protrusions 160 extend from the end 122 of the elastic part 120 between the respective bridges 150. The downward protrusions 160 are inclined at a tilt angle b of approximately 40 degrees toward the central axis 180 of each terminal connection part. Lower ends 162 of the respective downward protrusions 160 extend to a height lower than that of the first contact part 110. Consequently, when the connection member 100 is mounted to the electrode terminal of the lower battery cell (not shown), the downward protrusions 160 are connected to the electrode terminal of the lower battery cell while being elastically pressed.

Although each downward protrusion 160 exhibits somewhat low modulus of elasticity, the four downward protrusions 160 are independently connected to the electrode terminal of the lower battery cell. Consequently, the downward protrusions 160 prevent an instantaneous short circuit of the battery cell due to an external factor, such as vibration, thereby continuously maintaining the electrical connection between battery cells.

Also, as shown in FIG. 4, the elastic part 120, the first contact part 110 and the second contact part 120 of each terminal connection part are formed in the shape of a concentric circle. Also, the four protruding coupling parts 130 are formed in the shape of an imaginary concentric circle when the protruding coupling parts 130 are connected to one another. Consequently, each terminal connection part is constructed in a concentric circle structure, and therefore, the contact area and tight contact degree between each terminal connection part and the outer circumferences of the electrode terminals of cylindrical battery cells increase.

Figure 6:
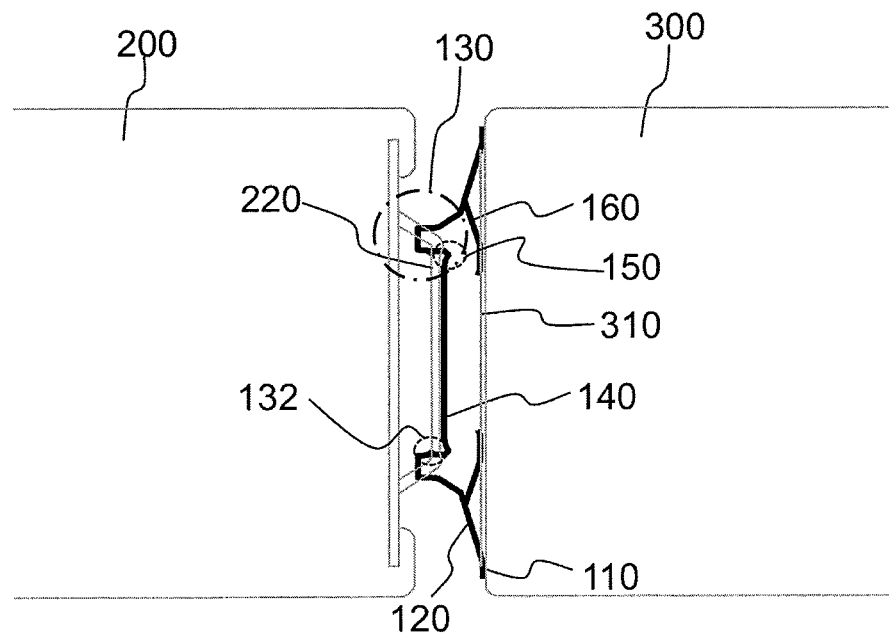
FIG. 6 is a side view typically illustrating the coupling between the connection member according to the present invention and electrode terminals of cylindrical battery cells.
Figure 7:
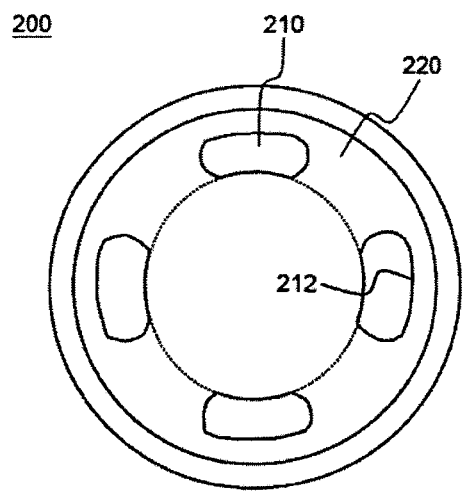
FIG. 7 is a plan view typically illustrating a cathode terminal of a conventional cylindrical secondary battery.

FIG. 6 is a side view typically illustrating the coupling between the connection member according to the present invention and electrode terminals of cylindrical battery cells in a structure in which the cylindrical battery cells are connected in series to each other, and FIG. 7 is a plan view typically illustrating a cathode terminal of a conventional cylindrical secondary battery.

Referring first to FIG. 7, four gas exhaust ports 210 are formed at the outer circumferential region of the cathode terminal 220 of the cylindrical secondary battery 200 such that gas generated in the cylindrical secondary battery 200 is exhausted through the gas exhaust ports 210.

Referring to FIG. 6, the protruding coupling parts 130, located at the upper part of the connection member, are inserted into and elastically coupled to gas exhaust ports 210 (see FIG. 7) of a cathode terminal 220 of an upper battery cell 200. At this time, the second contact part 140 contacts the cathode terminal 220 of the upper battery cell 200, whereby the electrical connection is achieved. Also, the coupling protrusions 132, formed at the inner side of the respective protruding coupling parts 130 in the central axis direction, are coupled to inside ends 212 of the respective gas exhaust ports 210 formed at the cathode terminal 220 of the upper battery cell 200, whereby the stable coupling is achieved.

On the other hand, the first contact part 110, located at the lower part of the connection member, contacts the outer circumference of an anode terminal 310 of a lower battery cell 300, and the downward protrusions 160, extending downward from the end of the elastic part 120, partially contact the outer circumference of the anode terminal 310 of the lower battery cell 300. As a result, the upper battery cell 200 and the lower battery cell 300 are electrically connected in series to each other.

Figure 8:
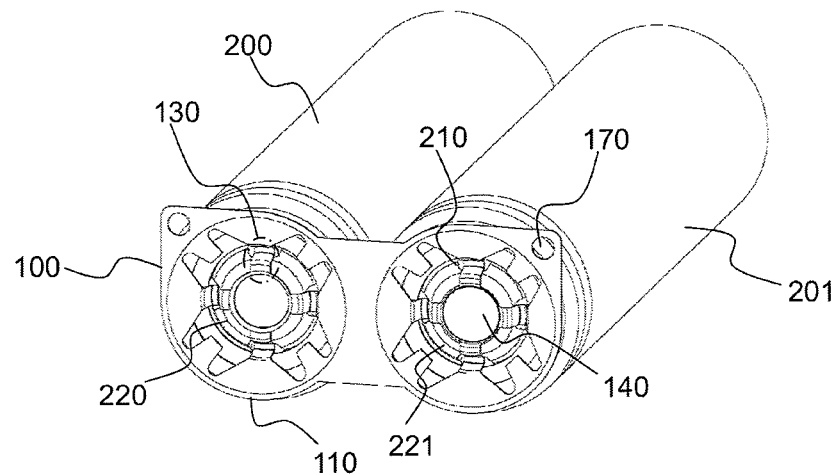
FIG. 8 is a perspective view illustrating a structure in which the connection member according to the present invention is coupled to electrode terminals of cylindrical battery cells such that the cylindrical battery cells are connected in parallel to each other.
Figure 9:
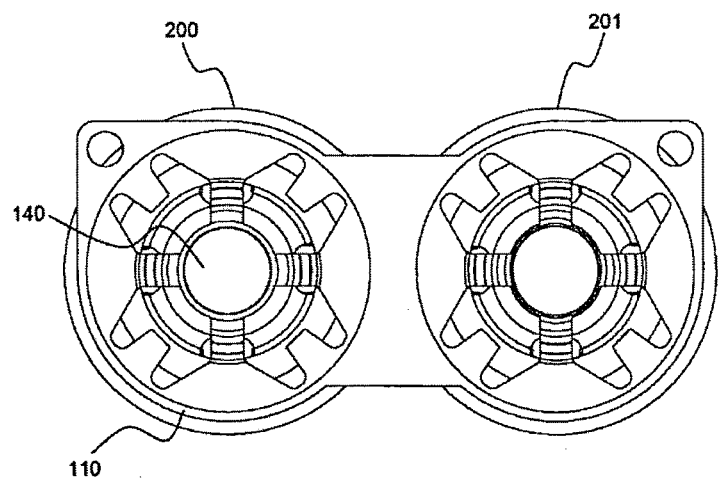
FIG. 9 is a front view of FIG. 8.
Figure 10:
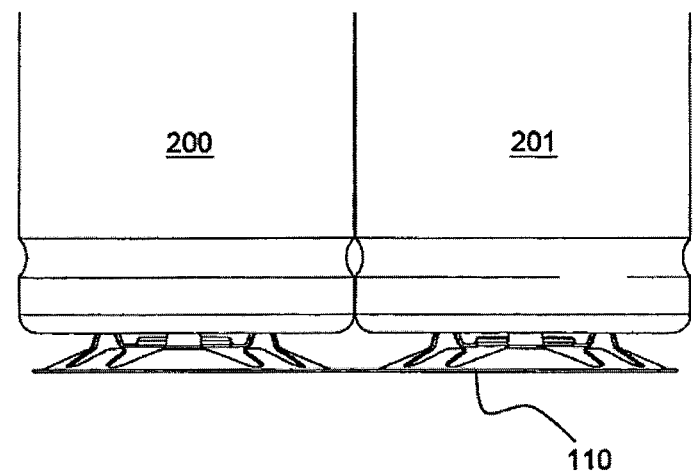
FIG. 10 is a plan view of FIG. 8.

FIG. 8 is a perspective view illustrating a structure in which the connection member according to the present invention is coupled to electrode terminals of cylindrical battery cells such that the cylindrical battery cells are connected in parallel to each other. FIG. 9 is a front view of FIG. 8, and FIG. 10 is a plan view of FIG. 8.

Referring to these drawings, two cylindrical battery cells 200 and 201 are arranged adjacent to each other, while cathode terminals 220 and 221 of the respective cylindrical battery cells 200 and 201 are oriented in the same direction, to constitute a bank.

The protruding coupling parts 130 of the connection member 100 are inserted into the corresponding gas exhaust ports 210 of the cylindrical battery cells 200 and 201, whereby the connection member 100 is elastically coupled to the cylindrical battery cells 200 and 201. Consequently, the physical coupling between the bank-structured cylindrical battery cells 200 and 201 is maintained by the connection member 100. Since the coupling protrusions (not shown) are elastically coupled to the respective gas exhaust ports 210, when the protruding coupling parts 130 of the connection member 100 are inserted into the respective gas exhaust ports 210, as described with reference to FIG. 6, the coupling force is very high. On the other hand, when the connection member is needed to separate as necessary, a tensile force sufficient to elastically bend backward the coupling protrusions may be applied to the coupling protrusions, with the result that the connection member 100 is separated from the cylindrical battery cells 200 and 201.

When the connection member 100 is coupled to the cylindrical battery cells 200 and 201, the bank is constructed in a structure in which the cylindrical battery cells 200 and 201 are connected in parallel to each other. The connection member 100 is made of a conductive material, such as a metal plate. Consequently, when the second contact parts 140 contact the cathode terminals 220 and 221 of the respective cylindrical battery cells 200 and 201, the electrical connection between the cathode terminals 220 and 221 of the respective cylindrical battery cells 200 and 201 is achieved. When the connection member 100 is coupled to the bank, the connection member 100 is arranged such that the first contact parts 110 are directed frontward. Consequently, when other cylindrical battery cells (not shown) are located in front of the connection member 100, as shown in FIG. 6, the connection in series between the cylindrical battery cells is achieved.

Also, the circuit connection terminal parts 170 are formed at the opposite-side upper ends of the connection member 100 in the form of a drilled hole, whereby the cylindrical battery cells connected in series and parallel to one another may be connected to an external circuit.

FIGS. 11 to 14 are typical views illustrating various modifications of the connection member shown in FIG. 3.

Figure 11:
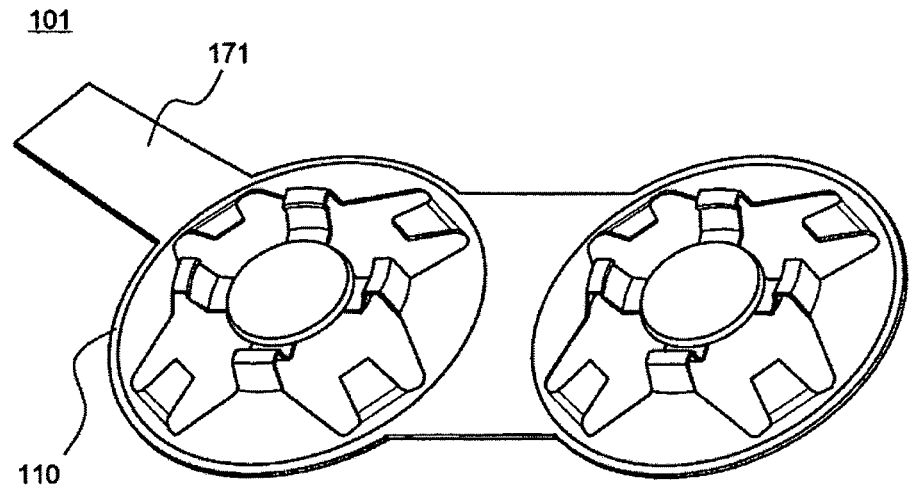
FIGS. 11 to 14 are typical views illustrating various modifications of the connection member shown in FIG. 3.

First, a connection member 101 of FIG. 11 is different from the connection member 100 of FIG. 3 in that a circuit connection terminal part 171 is formed in the shape of a strip extending from one of the first contact parts 110. The strip-shaped circuit connection terminal part 171 may be bent such that the circuit connection terminal part 171 is brought into tight contact with the side of a lower battery cell (not shown) after the connection member 101 is mounted to the lower battery cell.

Figure 12:
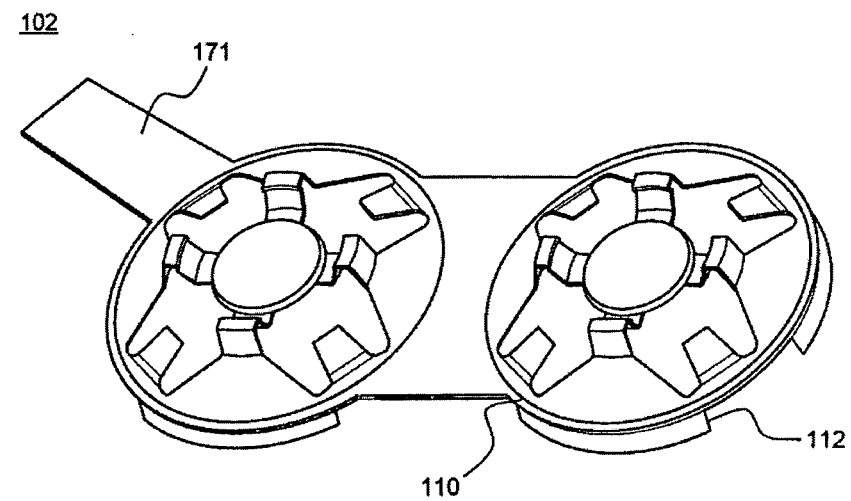

A connection member 102 of FIG. 12 is different from the connection member 100 of FIG. 3 in that a circuit connection terminal part 171 is formed in the shape of a strip extending from one of the first contact parts 110, and two or more downward extensions 112 are formed at the outer circumference of each first contact part 110 to partially cover the upper-end sides of lower battery cells.

The downward extensions 112 are constructed in a structure to partially cover the upper-end sides of the lower battery cells. Consequently, the downward extensions 112 prevent the connection member 102 from deviating in position from the lower battery cells due to external impact and maintain the secure coupling between the connection member 102 and the lower battery cells.

The two or more downward extensions are preferably arranged along the outer circumference of each first contact part in a symmetrical fashion. Consequently, the prevention of the connection member from deviating in position from the lower battery cells and the secure coupling between the connection member 102 and the lower battery cells are more effectively achieved.

The length of the downward extensions is not particularly restricted so long as the downward extensions are constructed in a structure to provide the above-mentioned effects. For example, the downward extensions may have a length equivalent to 20 to 150% of the total height of the connection member.

This structure enables the connection member to be connected to the upper battery cells and the lower battery cells in a coupling fashion. That is, the protruding coupling parts of the connection member are coupled to the electrode terminals of the upper battery cells, and the downward extensions of the connection member are coupled to the electrode terminals of the lower battery cells. Consequently, the connection member is coupled to both the upper and lower battery cells.

Figure 13:
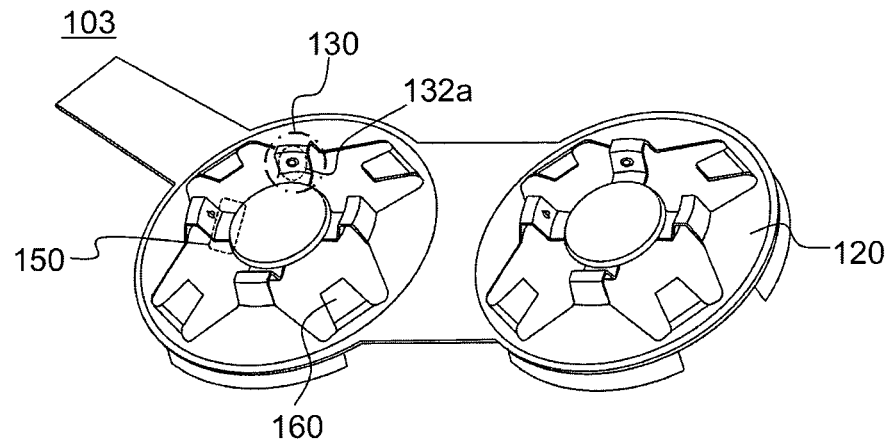

A connection member 103 of FIG. 13 is different from the connection member 102 of FIG. 12 in that coupling protrusions 132a protrude from the inner side of the protruding coupling parts 130 in the shape of a hemispherical protrusion. The hemispherical protrusion-shaped coupling protrusions 132a increase the mechanical coupling force between the connection member 103 and upper battery cells (not shown) when the connection member 103 is coupled to the upper battery cells.

Figure 14:
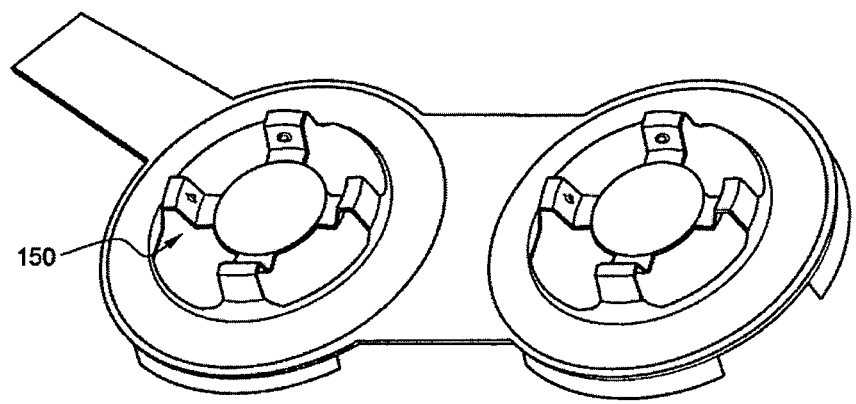

A connection member 104 of FIG. 14 is different from the connection member 103 of FIG. 13 in that no downward protrusions are formed between the bridges 150. Specifically, the connection member 103 of FIG. 13 is constructed in a structure in which downward protrusions 160 extending from the ends of the elastic parts 120 are formed between the bridges 150, whereas the connection member 104 of FIG. 14 has no downward protrusions.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the connection member according to the present invention does not need a welding or soldering process for electrical connection between electrode terminals of battery cells. Consequently, it is possible to prevent thermal damage to the battery cells and the occurrence of short circuits of the battery cells, which may be caused during welding, and to greatly reduce the defective production ratio. Also, it is possible to minimize the change in resistance at the terminal connection regions through the stable coupling structure between the electrode terminals of the battery cells and to greatly improve the production efficiency.

Furthermore, when some of the battery cells are defective, the battery cells may be easily separated from each other by a mechanical fashion, with the result that it is possible to reuse the remaining battery cells which are not defective. Also, it is possible to make the connection member of a material exhibiting high electrical conductivity as compared with a spot welding method, whereby it is possible to improve the efficiency of a battery pack.

In addition, the connection member according to the present invention exhibits high elasticity. Consequently, when an external force, such as dropping or vibration, is applied to the battery pack, it is possible for the connection member to protect the battery cells from the external force.

What is claimed is:

1. A connection member for electrically connecting a plurality of secondary battery cells arranged in the longitudinal direction and in the lateral direction in a physical contact fashion, when the secondary battery cells are mounted in a battery pack case, wherein
   the connection member comprises terminal connection parts for connecting the battery cells arranged in the longitudinal direction in series to each other, the terminal connection parts being connected to each other for achieving the connection in parallel between the battery cells arranged in the lateral direction, each terminal connection part including
   (a) a first contact part configured to correspond to the external shape of an electrode terminal of a lower battery cell, the first contact part contacting the electrode terminal of the lower battery cell at a region adjacent to the outer circumference of the electrode terminal, the first contact part having a predetermined width,
   (b) an elastic part tapered upward from the first contact part toward a central axis of each terminal connection part for elastically supporting the lower battery cell,
   (c) protruding coupling parts protruding upward from the elastic part to a predetermined height such that the protruding coupling parts are coupled to an electrode terminal of an upper battery cell, and
   (d) a second contact part disposed on the central axis of each terminal connection part such that the second contact part is depressed to a predetermined depth from the protruding coupling parts, the second contact part contacting the electrode terminal of the upper battery cell, and wherein
   the connection member is provided at one side thereof with a circuit connection terminal part.

2. The connection member according to claim 1, wherein the connection member is manufactured in a single body by pressing a conductive sheet.

3. The connection member according to claim 1, wherein the battery cells are cylindrical battery cells, and
   the contact parts, the elastic part, and the protruding coupling parts are constructed in a concentric circle structure.

4. The connection member according to claim 3, wherein the width of the first contact part contacting the battery cell is 5 to 20% of the radius of each terminal connection part.

5. The connection member according to claim 3, wherein the elastic part has a width equivalent to 20 to 60% of the radius of each terminal connection part and a tilt angle of 5 to 30 degrees.

6. The connection member according to claim 1, wherein the protruding coupling parts have a height equivalent to 30 to 70% of the total height of the connection member.

7. The connection member according to claim 1, wherein the protruding coupling parts are constructed in a structure in which two or more bridges connecting the elastic part and the second contact part are arranged in a symmetrical fashion.

8. The connection member according to claim 1, wherein the protruding coupling parts are formed in the vertical sectional shape of "∩."

9. The connection member according to claim 8, wherein each protruding coupling part is provided at one side thereof with a coupling protrusion, which protrudes toward the central axis of each terminal connection part.

10. The connection member according to claim 9, wherein the coupling protrusion is constructed in a structure in which the inner end of each protruding coupling part is bent toward the second contact part.

11. The connection member according to claim 9, wherein the coupling protrusion protrudes from the inner side of each protruding coupling part in the shape of a hemispherical protrusion.

12. The connection member according to claim 7, further comprising:
downward protrusions extending from the end of the elastic part between the respective bridges.

13. The connection member according to claim 12, wherein each of the downward protrusions has an end inclined to a height lower than that of the first contact part toward the central axis of each terminal connection part.

14. The connection member according to claim 12, wherein the downward protrusions are inclined at an angle of 20 to 70 degrees.

15. The connection member according to claim 1, wherein the first contact part is provided at the outer circumference thereof with two or more downward extensions constructed in a structure to partially cover the upper-end side of the lower battery cell.

16. A connection member for electrically connecting a plurality of secondary battery cells arranged in the longitudinal direction in a physical contact fashion, when the secondary battery cells are mounted in a battery pack case, the connection member comprising:
(a) a first contact part configured to correspond to the external shape of an electrode terminal of a lower battery cell, the first contact part contacting the electrode terminal of the lower battery cell at a region adjacent to the outer circumference of the electrode terminal, the first contact part having a predetermined width;
(b) an elastic part tapered upward from the first contact part toward a central axis of the connection member for elastically supporting the lower battery cell;
(c) protruding coupling parts protruding upward from the elastic part to a predetermined height such that the protruding coupling parts are coupled to an electrode terminal of an upper battery cell; and
(d) a second contact part disposed on the central axis of the connection member such that the second contact part is depressed to a predetermined depth from the protruding coupling parts, the second contact part contacting the electrode terminal of the upper battery cell,
the connection member being provided at one side thereof with a circuit connection terminal part.

17. A battery pack constructed in a structure in which a plurality of cylindrical battery cells are electrically connected to one another in rows in a pack case, wherein the battery cells arranged in the longitudinal direction and in the lateral direction are electrically connected to one another by a connection member according to claim 1.

18. The battery pack according to claim 17, wherein
a cathode terminal of a battery cell (a) is electrically connected to the upper part of the connection member via a second contact part, and
an anode terminal of a battery cell (b) is electrically connected to the upper part of the connection member via a first contact part.

19. The battery pack according to claim 18, wherein protruding coupling parts of the connection member are elastically coupled in gas exhaust ports formed at the cathode terminal of the battery cell.

20. The battery pack according to claim 19, wherein
the protruding coupling parts are constructed in a structure in which two or more bridges connecting the elastic part and the second contact part are arranged in a symmetrical fashion,
each protruding coupling part is provided at one side thereof with a coupling protrusion, which protrudes toward the central axis of the connection member, and
the protruding coupling parts are coupled to the inside ends of the gas exhaust ports when the connection member is coupled to the gas exhaust ports formed at the cathode terminal of the battery cell.

21. The battery pack according to claim 17, wherein the connection member is made of any one material selected from a group consisting of nickel, brass, aluminum, copper, and alloys thereof.

22. A laptop computer including a battery pack according to claim 17 as a power source.

* * * * *